United States Patent [19]
Dara

[11] Patent Number: 5,119,379
[45] Date of Patent: Jun. 2, 1992

[54] METHOD AND APPARATUS FOR FAULT REPORTING

[75] Inventor: Paul S. Dara, Broken Arrow, Okla.

[73] Assignee: Seiscor Technologies Inc., Tulsa, Okla.

[21] Appl. No.: 484,957

[22] Filed: Feb. 26, 1990

[51] Int. Cl.⁵ .............................................. G06F 11/30
[52] U.S. Cl. .................................. 371/29.1; 371/16.5
[58] Field of Search ................... 371/29.1, 16.5, 22.1; 324/73.1

[56] References Cited

U.S. PATENT DOCUMENTS

| | | | |
|---|---|---|---|
| 3,665,406 | 5/1972 | Gallagher | 364/200 |
| 4,326,249 | 4/1982 | Godsey | 364/200 |
| 4,578,773 | 3/1986 | Desai et al. | 371/29.1 |
| 4,635,260 | 1/1987 | Sestan | 371/29.1 |
| 4,654,820 | 3/1987 | Brahm et al. | 364/900 |
| 4,918,693 | 4/1990 | Ardini, Jr. et al. | 371/16.5 |

FOREIGN PATENT DOCUMENTS 0182837  9/1985  Japan .................................. 371/29.1

OTHER PUBLICATIONS

IBM Tech. Disc. Bull., vol. 31, No. 10, pp. 41-42, Mar. 1989.

Primary Examiner—Jerry Smith
Assistant Examiner—Henry C. Lebowitz
Attorney, Agent, or Firm—William R. Clark; Richard M. Sharkansky

[57] ABSTRACT

A method and apparatus for reporting faults on a control line running through a plurality of processors to a control processor. Each processor having a failure provides a unique address onto the control line. The addresses are then sequentially shifted through each of the processors having a failure to the control processor.

9 Claims, 1 Drawing Sheet

METHOD AND APPARATUS FOR FAULT REPORTING

BACKGROUND OF THE INVENTION

This invention relates to a method and apparatus for fault reporting and more specifically to arbitrating the reporting of a circuit board address when a fault occurs on the circuit board.

As is well known, it is desirable to provide apparatus that automatically reports the address of a faulty circuit board to a control processor. Upon receiving such a report, the control processor can log the address into its own internal memory, and then change the operational configuration so that the system continues to operate with the faulty circuit board off line.

One prior art approach for providing the address of a faulty board to a control processor is by the control processor polling each of the circuit boards individually. Typically, each circuit board is polled over a dedicated select line interconnecting each circuit board to the control processor. Thus, if there were ten circuit boards, ten select lines would be required. The circuit boards are also coupled to the control processor with a common data bus. When the circuit board detects a fault and when the faulty board is polled, the address of the faulty board is fed to the control processor over the common data bus.

This method of address reporting has the drawback of requiring that a separate select line be coupled to each of the circuit board via a back plane. Additional select lines increase back plane complexity. Added complexity may increase the system cost and decrease the system reliability.

SUMMARY OF THE INVENTION

An object of this invention is to provide an improved apparatus for fault reporting.

A further object of this invention is to provide a signal which indicates an address of a circuit with a failure and to store this address for later recall.

A further object of the invention is to provide an apparatus that reports the address of a circuit that fails to a control processor with a minimal number of signal lines.

Another object of this invention is to provide a system that has many circuits that apply a signal to a control processor over a single line, wherein the signal contains only the addresses of the circuits that have failures.

It is also an object of this invention to provide a device that arbitrates when the address of a faulty circuit is to be provided to a control processor.

An additional object of this invention is to provide a method for testing fault detection operation.

These and other objects are accomplished with an apparatus for reporting faults comprising a plurality of electronic circuits, each having a fault reporting circuit comprising means responsive to a fault in the respective electronic circuit for providing a fault signal. Also provided is a control processor comprising means for providing a fault request signal to each of the fault reporting circuits. Coupled to the apparatus is a source of a no-fault signal, and a line connected from the no-fault signal source serially through each one of the faulting reporting circuits to the control processor. Each of the fault reporting circuits further comprises means for generating an address uniquely corresponding to the respective electronic circuit, and means responsive to the fault signal and the fault request signal for interrupting the line and for serially shifting the respective address onto the line to the control processor. It may be preferable that the apparatus further comprises means for temporarily storing the address of a failed electronic circuit on the side of the line remote from the control processor and for subsequently transferring the address of the other failed electronic circuit to the control processor.

Alternately, these and other objects are accomplished with apparatus for reporting faults comprising means for generating a no-fault signal, means for generating a fault signal when a fault condition occurs in an electronic circuit having preset address. The apparatus further includes control means for periodically generating an address request signal, shift register means for generating an address signal having a preset address in response to said address request signal, and first switch means comprising means for coupling the no-fault signal to the control means and means responsive to the fault signal for decoupling said no-fault signal from said control means and for coupling said address signal to said control means. This first address signal includes the preset circuit address so that a control processor can identify the faulty board over a single data line. It may also be preferable that the apparatus further comprise second shift means for generating a second address signal having a second preset address in response to the address request signal, means for generating a second fault signal when a fault condition occurs in a second electronic circuit having a second preset address, and switch means. The switch means comprises means for coupling that no-fault signal to the first switch means and the first shift means, and means responsive to the second fault signal for decoupling the no-fault signal from the first switch means and for coupling the second address signal to the first switch means and the first shift means. Thus, a fault reporting apparatus is provided using only a small number of signal lines. It may be preferable that the control means comprises means for generating a force fault signal, and that the first fault detection means comprise means for generating the first fault signal in response to the force fault signal to allow the control processor to test the fault reporting circuitry.

Alternately, these objects may be accomplished by a method of reporting failures in a system having a control processor, a plurality of electronic circuits, and a fault line running serially through the electronic circuits to the control processor comprising the steps of providing a unique address from each electronic circuit having a failure, and sequentially shifting the addresses of the failed electronic circuits through the fault line to the control processor. It may be preferable that the method further comprise the steps of providing a no-fault signal, and sequentially shifting the no-fault signal through the fault line to the control processor after shifting the address of the failed circuit.

Another method in which these objects may be accomplished is by a method for reporting to a control processor faults that occur on a circuit having a preset address comprising the steps of generating a no-fault signal and generating a first fault signal when a fault condition occurs in the circuit. The method further comprises the steps of providing an address request signal to the circuit, generating a first address signal that indicates the preset address in response to the address request signal, and selectively coupling either the first address signal or the no-fault signal to the control processor in response to the first fault signal. It may be preferable that the method further comprise the steps of generating a second fault signal indicating a fault condition on a second circuit that has a second predetermined address, and providing a second address signal that indicates the second preset address to the control processor after the first address is provided in response to the address request signal. Further, the method comprises the step of sequentially coupling the no-fault signal after the second address signal in response to the second fault signal. It may further be preferable that the method comprise the step of sequentially providing the first address signal, the second address signal, and the no-fault signal to the control processor in response to the first and the second fault signal.

BRIEF DESCRIPTION OF THE DRAWINGS

For a more complete understanding of the invention, reference is made to the drawing, wherein.

DESCRIPTION OF THE PREFERRED EMBODIMENTS

Figure 1:
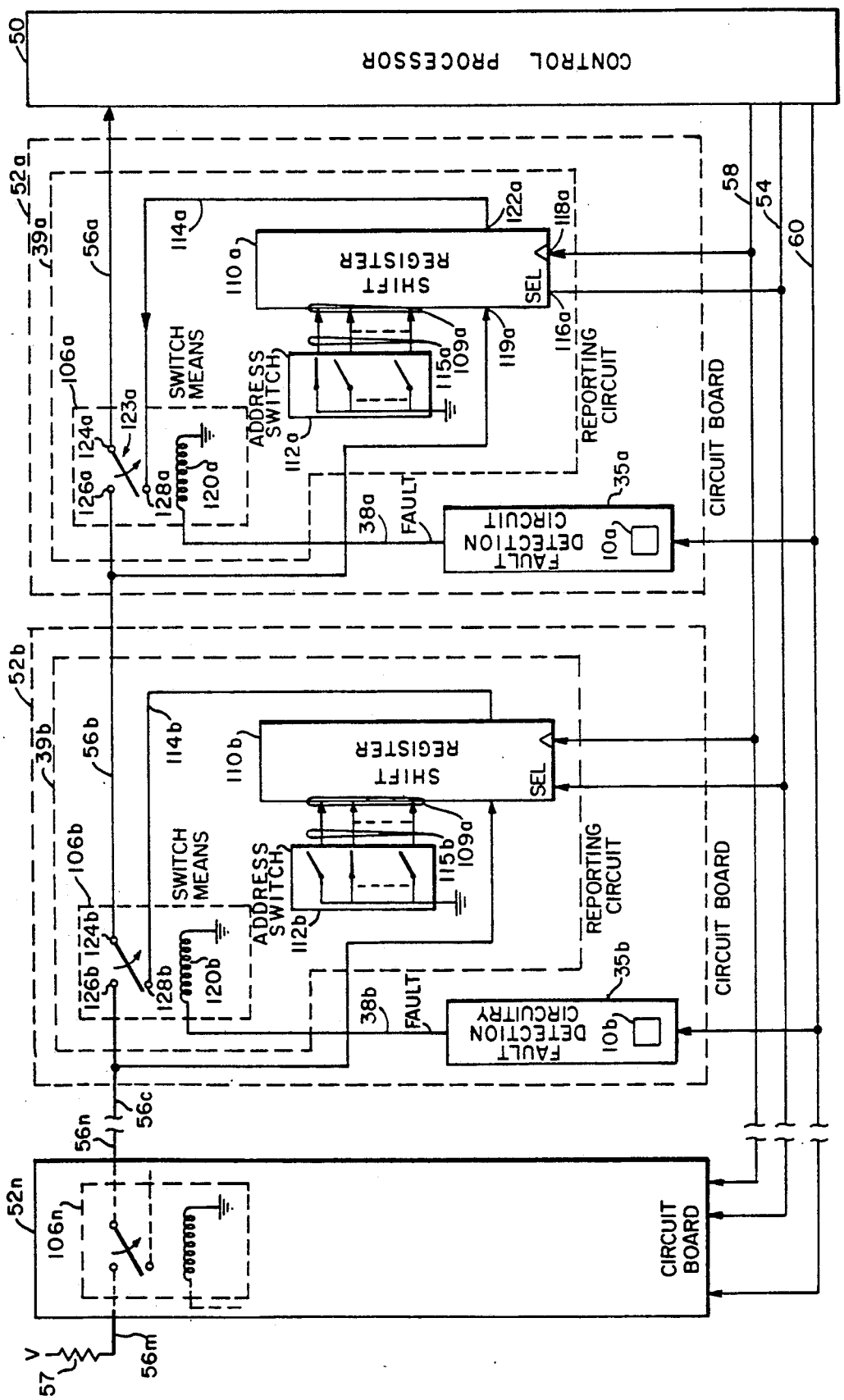
FIG. 1 is a system block diagram of the detection and reporting circuitry encompassing the invention.

Referring to FIG. 1, there is shown a system that reports faults on electronic circuitry 10a-n detected by fault detection circuitry 35a-b and 35c-n (not shown). The system has a common control processor 50 coupled to a plurality of identical circuit boards 52a-n. Control processor 50 communicates with circuit boards 52a-n through control line 54, data strobe line 58, and fault lines 56a-m. Control processor 50 preferably includes a microprocessor (not shown); however, control processor 50 is not limited to a microprocessor and may contain a state machine, computer, or any device that has the capability to provide a polling function.

Coupled to fault line 56m is resistor 57. Resistor 57 pulls up fault line 56m to a voltage level V, and when no faults occur on any of circuit boards 52a-n, resistor 57 feeds a no-fault signal to control processor 50 by pulling up the voltage level on lines 56a-m.

Control processor 50 provides address request and control signals to circuit boards 52a-n through control line 54, data strobe line 58, and force fault line 60. Control line 54, data strobe line 58, force fault line 60, and fault lines 56a-m are preferably disposed on a back plane (not shown).

When a fault occurs within one of circuit boards 52a-n, such as circuit board 52b, circuit board 52b feeds an address signal containing a preset stored address through fault line 56b to circuit board 52a. Circuit board 52a responds to the address signal on fault line 56b and address request signals on both control line 54 and data strobe line 58 by providing an address signal indicating the address of the faulty circuit board 52b to control processor 50 through fault line 56a.

Circuit boards 52a and 52b are shown in FIG. 1 in detail and an outline of circuit board 52n is shown; however, as circuit boards 52a, 52b, and 52n are identical, an explanation will be given only for circuit board 52a. Exemplary circuit board 52a contains a fault detection circuitry 35a and report circuit 39a coupled to electronic circuitry 10a through fault line 38a. Alternately, fault detection circuit 35a and report circuit 39a may be located on the back plane adjacent circuit board 52a.

Fault detection circuitry 35a is coupled to reporting circuit 39a through fault line 38a. Fault detection circuitry 35a provides fault signals to report circuit 39a through fault line 38a in response to both faults on circuitry 10a and a force fault signal from the control processor 50 through force fault line 60.

Reporting circuitry 39a includes parallel input/serial output shift register 110a and a switch 112a. One such shift register 110a is a 74HC166, manufactured by Motorola Company of Tempe, Ariz. Terminals 109a of shift register 110a are coupled to switch 112a through lines 115a. The settings of switch 112a correspond to the address of the circuit board 52a. Each of switches 112a, 112b ... 112n is set to a unique identifying setting. Switch 112a applies address signals to shift register 110a. Shift register 110a includes an input terminal 119a that is connected to fault line 56b and has an output terminal 122a that is coupled to serial output line 114a. Shift register 110a has a serial shift/parallel load select terminal 116a coupled to control line 54. Shift register 110a has a clock terminal 118a that is connected to data strobe line 58.

Switch means 106a includes coil 120a and switch 123a having terminals 124a, 126a, and 128a. Coil 120a is coupled to fault line 38a. Terminals 124a, 126a, and 128a are coupled to fault lines 56a, 56b, and serial output line 114a, respectively. Switch means 106a is normally closed, i.e., terminal 124a is coupled to terminal 126a; however, when a fault signal is applied to fault line 38a, coil 120a energizes, resulting in switch means 106a opening, i.e., switch 123a electrically connecting terminal 128a to terminal 124a. In other words, fault line 56b is normally coupled to fault line 56a; however, when a fault detection circuit 35a detects a fault in electronic circuitry 10a, output terminal 122a is coupled to control processor 50 through fault line 56a.

Control processor 50 resets shift registers 110a by applying an initialize signal to control line 54 and data strobe line 58. The initialize signal applied through control line 54 to select terminal 116a selects a parallel load, and the initialize signal applied to data strobe line 58 pulses clock terminal 118a. In response to the initialize signal, the address signals applied to line 115a by switch 112a is loaded into shift register 110a. The address signal has eight bits; however, by known techniques, shift register 110a and switch 112a may be cascaded to accommodate more address bits.

When fault detection circuitry 35a senses a fault in electronic circuit 10a, detection circuit 35a feeds a fault signal onto line 38a. Coil 120a energizes in response to the fault signal. Switch means 106a responds to coil 120a being energized by coupling terminal 124a to terminal 128a, thereby opening switch means 106a.

Control processor 50 periodically feeds an address request signal to circuit boards 52a-n. On circuit board 52a, this address request signal indicates to reporting circuitry 39a-n to feed its address onto line 114a. Control processor 50 applies the address request signal to circuit boards 52a-n by applying a series of eight pulses to data strobe line 58 while simultaneously applying a serial output select signal to control line 54. Exemplary shift register 110a responds to the series of eight pulses on data strobe line 58 and select signal applied to control line 54 by feeding the eight-bit address loaded into shift register 110a onto line 114a.

When a fault occurs on circuit board 52a, resulting in terminal 124a being coupled to terminal 128a, the eight-bit address of that board 52a is serially fed from the shift register 110a through fault line 56a to control processor 50. When no faults occur on circuit board 52a, the signal on fault line 56b is applied through switch means 106a, through fault line 56a to control processor 50.

As another example, when fault detection circuitry 35b detects a fault on electronic circuitry 10b, and no faults are present on electronic circuitry 10a, or electronic circuitry 10c-n, switch 106b opens and switches 106a and 106c-n remain closed. Accordingly, when control processor 50 provides an address request signal to circuit boards 52a-n, shift register 110b, on circuit board 52b responds to the address request signal by serially feeding its eight-bit preset address through line 114b, switch means 106b, fault line 56b, switch means 106a and fault line 56a to control processor 50. Shift register 110b simultaneously responds to the address request signal (i.e., the pulses applied to data strobe line 58 and the select signal applied to line 54) by internally loading the no-fault signals on line 56c. Control processor 50 then records the eight-bit preset address applied to fault line 56a within control processor 50 internal memory (not shown) for later recall.

Control processor 50 next applies a second address request signal to circuit boards 52a-n. Shift register 110b on circuit board 52b responds to the address request signal by serially shifting out onto fault line 56b the no-fault signals loaded from line 56c while continuing to load in signals on line 56c. Control processor 50 then reads the no-fault signal on fault line 56a.

Control processor 50, after detecting a first address signal, continues to apply the address request signal to circuit boards 52a-n and continues to read and store addresses on fault line 56a until a no-fault signal having predetermined signal pattern, such as a multiplicity of consecutive logic true bits is recognized by control processor 50. In this example, the control processor 50 would recognize the no-fault signal, would stop applying address request signals to circuit boards 52a-52n after first applying the second address request signal. After recognizing the no-fault signal, control processor 50 re-initializes shift registers 110a-n in the manner explained previously.

When faults occurs on more than one circuit board, for example circuit board 52b and circuit board 52a, both switches 106a and 106b become open. Accordingly, when control processor 50 feeds an address request signal to circuit boards 52a-n, the preset address loaded into shift register 110a is applied through line 114a to fault line 56a, while the preset address loaded into shift register 110b is applied through line 114b, switch means 106b, line 56b, and then loaded into shift register 110a. Further, while the preset address in shift register 110b is applied to shift register 110a, a no-fault signal having logic true level on fault line 56c, resulting from pull-up resistor 57 is loaded into shift register 110b.

As control processor 50 applies address request signals to circuit boards 52a-n, all the address bits in shift register 110a are shifted through and then applied to control processor 50 via fault line 56a. Control processor 50 continues to apply address request signals until control processor 50 recognizes the no-fault signal on fault line 56a being shifted through shift registers 110b and 110a. Control processor 50 then records the preset addresses of the faulty boards and then resets circuit boards 52a-n by feeding the initialize signal onto control line 54 and data strobe line 58. By shifting address bits in this manner, only one fault line 56a-n and two control lines, control line 54 and data strobe line 58, are required to provide the address of a faulty circuit board.

Control processor 50 may selectively test circuit boards 52a-n by applying a fault signal onto force fault line 60. Fault detection circuitry 35a-n responds to the fault signal on force fault line 60 by feeding a force fault signal through line 38a-n and into switch means 106a-n, respectively. Switch means 106a-n respond to the fault control signals on their respective lines 38a-n by opening.

Control processor 50 next applies a series of address request signals to circuit boards 52a-n and then reads the addresses on fault line 56a. Control processor 50 continues to apply the address request signal until detecting a no-fault signal. After detecting the no-fault signal, the control processor checks the address signals and verifies that the preset address of each of circuit boards 52a-n have been provided. If a circuit board address was not received, the control processor 50 may then signal an error and may then record the address of the card that was not provided for later reference.

After testing the circuit boards 52a-n, the control processor removes the fault control signal on line 60. Switches 106a-n respond to the removal of the fault signal on line 60 by removing the fault signal on their respective lines 38a-n. Switch means 106a-n respond to the removal of the fault signal on lines 38a-n by closing their respective switches 123a-h. Control processor 50 next resets circuit boards 52a-n by feeding them an initialize signal.

Having described the preferred embodiments of this invention, it is now evident that other embodiments incorporating these concepts may be used. It is felt, therefore, that this invention should not be restricted to the disclosed embodiments, but should be limited only by the spirit and scope of the appended claims.

What is claimed is:

1. An apparatus for reporting faults comprising:
   a plurality of electronic circuits, each having a fault reporting circuit comprising means responsive to a fault in said respective electronic circuit for providing a fault signal;
   a control processor comprising means for providing a fault report request signal to each of said fault reporting circuits;
   a source of a no-fault signal;
   a line connected from said no-fault signal source serially through each one of said fault reporting circuits to said control processor; and
   each of said fault reporting circuits further comprising:
   (a) means for generating an address uniquely corresponding to said respective electronic circuit; and
   (b) means responsive to said fault signal and said fault report request signal for interrupting said line and for serially shifting said respective address onto said line to said control processor.

2. The apparatus as recited in claim 1 further comprising means for temporarily storing the address of a failed electronic circuit on the side of another electronic circuit remote from said control processor and for subsequently transferring said address of said failed electronic circuit to said control processor.

3. An apparatus for reporting faults comprising:
   means for generating a no-fault signal;

means for generating a fault signal when a fault condition occurs in an electronic circuit;

control means for periodically generating an address request signal;

first shift means for generating an address signal having a first preset address in response to said address request signal;

first switch means comprising:
  a) means for coupling said no-fault signal to said control means; and
  b) means responsive to said fault signal for decoupling said no-fault signal from said control means and for coupling said address signal to said control means;

second shift means for generating a second address signal having a second preset address in response to said address request signal;

means for generating a second fault signal when a fault condition occurs in a second electronic circuit; and second switch means comprising:
  a) means for coupling said no-fault signal to said first switch means and said first shift means; and
  b) means responsive to said second fault signal for decoupling said no-fault signal from said first switch means and for coupling said second address signal to said first switch means and said first shift means.

4. The apparatus as recited in claim 3 wherein said first shift means further comprises means responsive to a second address request signal for providing said second address signal to said first switch means after said first address signal is generated.

5. An apparatus for reporting faults comprising:
means for providing a no-fault signal;
control processor means for providing an initialize signal and a request signal;
a first circuit board comprising:
  a) an electronic circuit;
  b) address switch means for generating a preset address;
  c) first shift means for storing said first preset address in response to said initialize signal and for generating an address signal that includes said first stored address in response to said address request signal;
  d) first fault detection means for generating a first fault signal indicating a fault condition within said electronic circuit; and
  e) first switch means comprising:
    (i) means for coupling said no-fault signal to said control processor; and
    (ii) means responsive to said first fault signal for decoupling said no-fault signal from said control processor and for coupling said address signal to said control processor; and a second circuit board address comprising:
  a) a second electronic circuit;
  b) second address switch means for generating a second preset address;
  c) second shift means for storing said second preset address in response to said initialize signal and for generating a second address signal that includes said second stored address in response to said address request signal;
  d) second fault detection means for generating a second fault signal indicating a fault condition within said second electronic circuit;
  e) second switch means comprising:
    (i) means for coupling said no-fault signal to said first shift means and said first switch means; and
    (ii) means responsive to said second fault signal for decoupling said no-fault signal from said first shift means and said first switch means, and for coupling said second address signal to said first switch means and said first shift means.

6. The apparatus as recited in claim 5 wherein said second shift means further comprises means responsive to said address request signal for providing said second address signal to said first switch means and said first shift means while said first address signal is generated.

7. The apparatus as recited in claim 5 wherein said control means comprises means for generating a force fault signal; and wherein said first fault detection means comprise means for generating said first fault signal in response to said force fault signal.

8. The method of reporting failures in a system having a control processor, a plurality of electronic circuits each with a fault reporting circuit and a fault line running from a source of a no-fault signal serially through the fault reporting circuits to the control processor comprising the steps of:
  providing a unique address from each of said fault reporting circuits corresponding to an electronic circuit having a failure;
  sequentially shifting said unique addresses of said failed electronic circuits on said fault line to the control processor through intermediate ones of said fault reporting circuits; and
  providing a no-fault signal and sequentially shifting said no-fault signal along said fault line to the control processor through each of said faulting reporting circuits after shifting said unique addresses of said failed electronic circuit.

9. The method as recited in claim 10 further comprising the step of:
  providing an address request signal; and wherein said unique address from each failed electronic circuit is provided in response to said address request signal.

* * * * *